Jan. 24, 1956 R. A. GROUSE 2,731,706
MANUFACTURE OF CAPACITORS
Filed Sept. 11, 1951
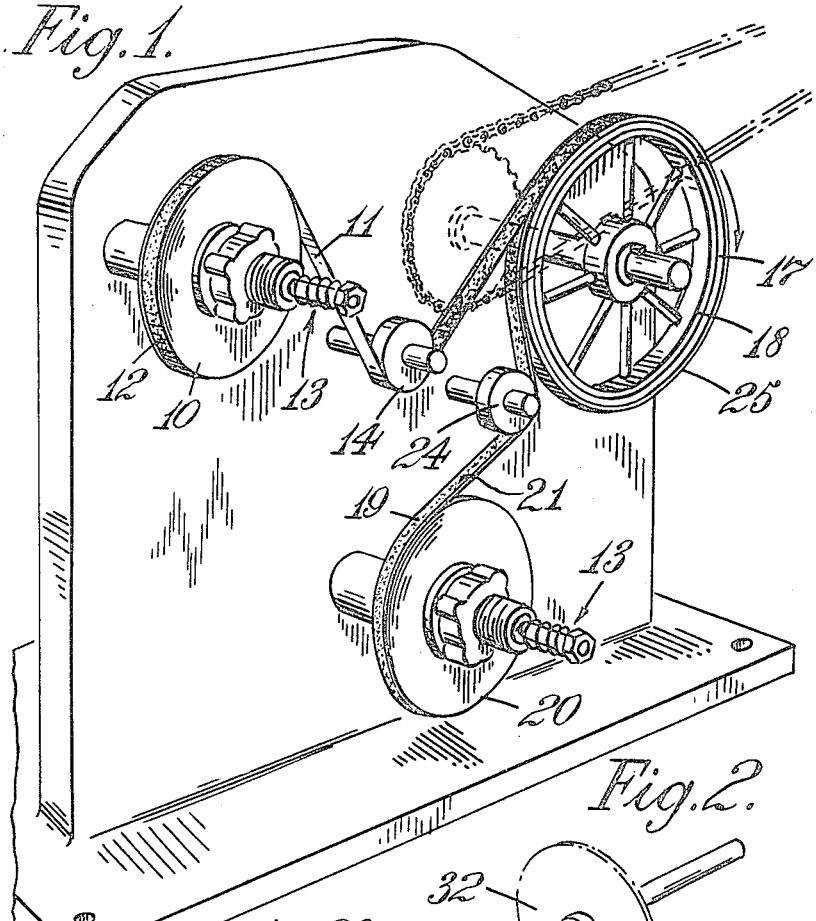
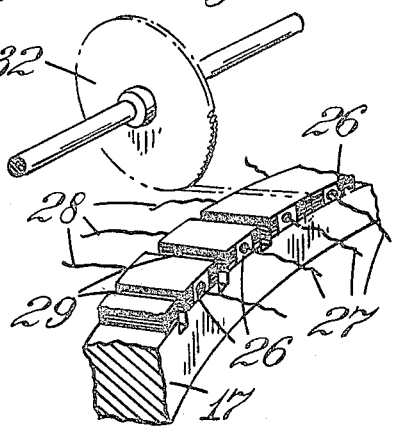
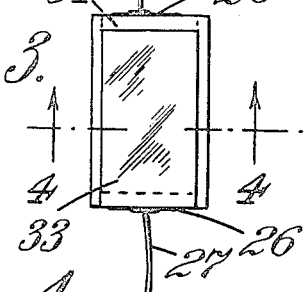
INVENTOR
R. A. Grouse
By Watson, Cole, Grindle & Watson United States Patent Office 2,731,706
Patented Jan. 24, 1956

2,731,706

MANUFACTURE OF CAPACITORS

Richard Alfred Grouse, London, England, assignor to A. H. Hunt Capacitors Limited, London, England, a British company Application September 11, 1951, Serial No. 246,114

Claims priority, application Great Britain December 13, 1950

5 Claims. (Cl. 29—25.42)

This invention relates to the manufacture of fixed capacitors. The manufacture of such capacitors having sheet dielectric involves the building up of a laminated structure in which dielectric and electrodes are interleaved. The two most common methods of achieving this are stacking, where usually rigid dielectrics such as mica or glass are used, and winding, where flexible dielectrics and electrodes are wound together into a roll. Whichever method is used the capacitors are usually subjected to a number of subsequent operations such as having their ends sprayed with metal, the fixing of terminal wires, impregnation, the application of outer casings and so forth. This involves considerable and difficult handling, the difficulties increasing as the capacitors are smaller in size. Very small stacked capacitors are extremely troublesome to make.

It is an object of the present invention to facilitate manufacture of stacked capacitors.

According to one feature of this invention a process of manufacture of stacked capacitors consists in taking strip dielectric metallised continuously along on one face so that the metallisation extends up to one edge, the metallisation being thin enough to be self-sealing, assembling the metallised strip material into a multi-layer assembly in which in successive metallised layers the metallisation alternately extends up to one edge and then in the next layer up to the other edge, and then forming separate capacitors by cutting the assembly into sections. By "thin enough to be self-sealing" is meant that the metallisation on the dielectric is thin enough (usually of the order of thickness of 0.000002 inch) to be volatilised in the event of a short circuit between opposite poles of the capacitors, without damage to the dielectric.

According to another feature of this invention the multi-layer assembly is formed by winding a strip or strips of dielectric round a former so as to produce an annulus which is thereafter cut into segments to form the separate capacitors. One or more unmetallised strips of dielectric may be positioned between the layers of metallised dielectric.

The annulus may be wound from two strips of dielectric so that one is superposed upon the other, each strip being metallised on one face in a manner such that the metallisation of one strip extends continuously over the face except for a non-metallised marginal-portion along one edge of the strip, and the metallisation of the other strip extends similarly over the face but for a non-metallised marginal-portion along the opposite edge of the strip.

Preferably the edges of the assembly are sprayed with metal, terminal wires soldered thereto, and the assembly as a whole vacuum-dried and impregnated, before the subdivision of the assembly into separate capacitors.

According to yet another feature of this invention the assembly is divided into separate capacitors by a knife or saw which is at a sufficiently different potential from each metallised surface that the metallisation is burnt back a short way from the cut edges of the dielectric. Alternatively, the assembly may be divided into separate capacitors by an uncharged knife or saw and the cut edges of the capacitors subsequently placed in contact with an electrode of sufficiently different potential to the metallised surfaces that the metallisation is burnt back a short way from the edges of the dielectric.

One process in accordance with this invention will now be described by way of example, reference being made to the accompanying drawing, in which:

Figure 1 is a diagrammatic view of an apparatus for carrying out the process,

Figure 2 is a diagrammatic view of a portion of an annulus which has been wound by the apparatus shown in Figure 1, a cutting-saw for sub-dividing the annulus also being shown, Figure 3 is a plan view of a capacitor which has been cut from the annulus shown in Figure 2, and Figure 4 is a sectional view along the line 4—4 of Figure 3.

Referring to Figure 1, reference 10 denotes a stock-roll of a single strip 11 of paper dielectric which on one surface has been metallised by a known process of aluminium deposition in vapour form in vacuo. The metallisation extends continuously over the surface of the paper strip with the exception of a marginal, non-metallised, portion 12. A tensioning arrangement, indicated generally at 13, is of a well-known kind and enables a convenient tension to be placed on the roll 10 so that it will not unwind too freely. The strip 11 is led from the roll 10 by way of a guide-roller 14, to a forming-ring 17 which is located on a power-driven winding-wheel 18.

A similar stock-roll to that described above is indicated at 20 and consists of a single strip 19 of metallised paper dielectric, the essential difference being that the non-metallised, marginal, portion 21 of the strip 19 is disposed on the opposite edge from that of the strip 11. The roll 20 is also provided with a tensioning arrangement 13 and in a similar manner as described above, the strip 19 is led from the roll 20 by way of a guide-roller 24 to the forming-ring 17.

The strips 11 and 19 are so disposed that when they are wound onto the forming-ring the metallised surface of one strip engages the non-metallised surface of the other. It will be appreciated that, as indicated at 25, an annulus may be wound on to the forming-ring and that this will comprise alternate layers of dielectric and metallisation, the layers of metallisation extending alternately from opposite end-faces of the annulus.

After an annulus of a predetermined number of turns has been built up, the strips 11 and 19 of paper are cut and the free ends of the annulus secured to the annulus by a suitable adhesive. The annulus together with the forming-ring is removed from the winding-wheel as a single unit and subsequent operations performed upon the annulus whilst it is still in position on the forming-ring.

The first operation is to spray the end-faces of the annulus with copper, but before this is carried out the end-faces are masked so that areas of metallisation are sprayed only on portions of the annulus which are later to become the end-portions of the capacitors. After this operation the annulus and former are placed in an indexing device and terminal wires soldered to those areas which have been sprayed with copper. In Figure 2, which shows a portion of the annulus at a later stage, the areas of sprayed copper are shown at 26, and the terminal-wires at 27 and 28.

In accordance with normal practice the next step is vacuum-drying and impregnation. It is particularly advantageous to use for the impregnant a suitable material which by heat or chemical action can be made permanently solid after impregnation. In general, materials capable of polymerisation and having good impregnating and dielectric properties are preferred. By using these materials the annulus as a whole becomes in effect solid. The advantage of this will later be seen.

After the drying and impregnating operation, the annulus and former are placed in another indexing mechanism which rotates the annulus step by step to an electrically charged circular cutting-saw which divides the annulus by axial cuts into the appropriate capacitor sections. Figure 2 shows a portion of the annulus during this operation with saw-cuts indicated at 29. The saw, which is shown at 32, is at a sufficiently positive potential with regard to the metallised layers of dielectric that the metallisation is burnt back from the cut edges of the dielectric. This eliminates any danger of a flash over which might otherwise occur if the metallisation were left extending up to the sides of the capacitor stack.

A capacitor which has been divided from the annulus is shown in Figures 3 and 4. It will be noted that the electrodes 33 and 34 are arranged alternately and are separated by layers of dielectric. The electrode-portions 33 extend up to one end-face of the capacitor where a terminal connection is made, whilst the electrode-portions 34 extend up to the opposite end-face where a similar connection is made. In fact the capacitor is in all ways similar to the normal form of stacked capacitor.

After division from the annulus, the capacitor sections will remain on the forming-ring due to the adhesive properties of the solidified impregnant. If desired, subsequent operations may be formed in the indexing mechanism, as for example, testing, printing and the ejection of the capacitors from the forming-ring. The latter operation may be performed in conjunction with the electrical test so that satisfactory and faulty capacitors are ejected into separate receivers.

Where manufacturing policy requires it the capacitors may be tested on the forming-ring together, instead of individually. This may be done by appropriate connection of their terminal wires to place the capacitors in parallel with one another. If they stand up together to a flash test and are within a certain percentage of their desired total capacity, they may be declared satisfactory. If this is not so, and one or both of the tests prove that the capacitors are not of the required standard, then the capacitors can subsequently be tested individually to show up those which are faulty.

The capacitor sections will, of course, be slightly curved but as the radius of curvature is large in comparison with the dimensions of the sections this is not objectionable either technically or commercially. If desired, however, the capacitors may be flattened by any convenient mechanical means.

The final operation to be performed is the application of a protective casing to the capacitor. This is a separate process and may be carried out by any of the well-known methods.

It will be understood that the annulus may be formed by winding more than one pair of metallised strips of dielectric each pair being arranged as that described in the foregoing example. The construction of the annulus resulting will be equivalent to that described. Further, it may be desirable in certain instances where it is required to separate the electrodes of the capacitor by a relatively large thickness of dielectric, to wind one or more plain strips of dielectric between the metallised strips.

I claim:

1. A process of manufacture of stacked capacitors comprising the steps of taking thin flexible metallized dielectric strip material and winding it spirally around a former to produce an annulus composed of a plurality of layers in which successive layers of metallization are separated by dielectric, impregnating the anulus with a solidifiable impregnating material and solidifying said material after impregnation to cause the annulus to adhere temporarily to the former, forming individual capacitors by cutting the annulus into segments which remain adhering to the former, testing the individual capacitors while they are still on the former, and thereafter parting the capacitors from the former.

2. A process of manufacture of stacked capacitors comprising the steps of taking thin flexible metallized dielectric strip material and winding it spirally around a former to produce an annulus composed of a plurality of layers in which successive layers of metallization are separated by dielectric, impregnating the annulus with a solidifiable impregnating material and solidifying said material after impregnation to cause the annulus to adhere temporarily to the former, forming individual capacitors by cutting the annulus into segments which remain adhering to the former, testing the individual capacitors while they are still on the former by rotating the former stepwise so that the capacitors arrive in turn at a testing station, and thereafter parting the capacitors from the former.

3. A process of manufacture of stacked capacitors comprising the steps of taking thin flexible dielectric strip material metallized continuously along one face only with metallization that extends up to one edge only of the strip, winding the metallized strip material spirally around a circular former to produce an annulus composed of a plurality of layers in which successive layers of metallization are separated by dielectric and the metallization alternately extends up to one edge and then in the next layer up to the other edge, impregnating the annulus with a solidifiable impregnating material and solidifying said material after the impregnating process to cause the annulus to adhere temporarily to the former, forming individual capacitors by cutting the annulus into segments which remain adhering to the former, subjecting the cut edges to an electrical potential sufficiently different from that of the metallized surfaces to cause the metallization to be burnt back a short way from said cut edges, testing the individual capacitors while they are still on the former by rotating the former stepwise so that the capacitors arrive in turn at a testing station, and thereafter parting the capacitors from the former.

4. A process of manufacture of stacked capacitors comprising the steps of taking thin flexible dielectric strip material metallized continuously along one face only with metallization that extends up to one edge only of the strip, winding the metallized strip material spirally around a circular former to produce an annulus composed of a plurality of layers in which successive layers of metallization are separated by dielectric and the metallization alternately extends up to one edge and then in the next layer up to the other edge, connecting a first series of terminals spaced around one side of the annulus to the metallized layers extending up to that side and a second series of terminals spaced around the other side of the annulus and opposite the first series to the metallized layers extending up to the other side, impregnating the annulus with a solidifiable impregnating material and solidifying said material after the impregnating process to cause the annulus to adhere temporarily to the former, forming individual capacitors by cutting the annulus into segments each bearing a pair of terminals, the segments remaining adhered to the former, subjecting the cut edges to an electrical potential sufficiently different from that of the metallized surfaces to cause the metallization to be burnt back a short way from said cut edges, and thereafter parting the capacitors from the former.

5. A process of manufacture of stacked capacitors comprising the steps of taking thin flexible dielectric strip material metallized continuously along one face only with metallization that extends up to one edge only of the strip, contiguously winding two strips of said dielectric material spirally around a circular former to produce an annulus composed of a plurality of layers, the strips being arranged with the metallization of one against the unmetallized surface of the other and being in mutually reversed relationship edge for edge so that successive layers of metallizaiton in the annulus are separated by dielectric and the metallization alternately extends up to one edge and then in the next layer up to the other edge, connecting a first series of terminals spaced around one side of the annulus to the metallized layers extending up to that side and a second series of terminals spaced around the other side of the annulus and opposite the first series to the metallized layers extending up to the other side, impregnating the annulus with a solidifiable impregnating material and solidifying said material after the impregnating process to cause the annulus to adhere temporarily to the former, forming individual capacitors by cutting the annulus into segments each bearing a pair of terminals, the segments remaining adhered to the former, subjecting the cut edges to an electrical potential sufficiently different from that of the metallized surfaces to cause the metallization to be burnt back a short way from said cut edges, and thereafter parting the capacitors from the former.

References Cited in the file of this patent

UNITED STATES PATENTS

| | | |
|---|---|---|
| 1,892,755 | Scheppmann | Jan. 3, 1933 |
| 1,952,925 | Kopinski | Mar. 27, 1934 |
| 2,166,205 | Anderson et al. | July 18, 1939 |
| 2,274,011 | Strab | Feb. 24, 1942 |
| 2,399,798 | Grouse et al. | May 7, 1946 |
| 2,569,414 | Godley et al. | Sept. 25, 1951 |

FOREIGN PATENTS

| | | |
|---|---|---|
| 885,194 | France | May 17, 1943 |
| 122,386 | Australia | Sept. 30, 1946 |